United States Patent
Bouyoucos (10) Patent No.: US 6,606,958 B1
(45) Date of Patent: Aug. 19, 2003

(54) TOWED ACOUSTIC SOURCE ARRAY SYSTEM FOR MARINE APPLICATIONS

(75) Inventor: John V. Bouyoucos, Rochester, NY (US)

(73) Assignee: Hydroacoustics Inc., Rochester, NY (US)

( * ) Notice: Subject to any disclaimer, the term of this patent is extended or adjusted under 35 U.S.C. 154(b) by 0 days.

(21) Appl. No.: 09/594,532

(22) Filed: Jun. 14, 2000

Related U.S. Application Data (60) Provisional application No. 60/140,392, filed on Jun. 22, 1999.

(51) Int. Cl.$^7$ .............................................. B63B 21/56
(52) U.S. Cl. ..................... 114/242; 114/254; 367/20
(58) Field of Search ............................. 114/242, 243, 114/254; 367/20, 23, 154, 14, 15, 16, 19, 106, 130, 153

(56) References Cited

U.S. PATENT DOCUMENTS

| | | | | |
|---|---|---|---|---|
| 3,434,446 A | * | 3/1969 | Cole ............................ | 114/242 |
| 3,469,551 A | * | 9/1969 | Lefebvre ..................... | 114/242 |
| 3,560,912 A | * | 2/1971 | Spink et al. ................. | 367/20 |
| 3,987,745 A | * | 10/1976 | Chaverebiere de Sal et al. ................ | 114/242 |
| 4,049,078 A | * | 9/1977 | Paitson et al. .............. | 181/120 |
| 4,197,591 A | * | 4/1980 | Hagemann ................. | 367/106 |
| 4,207,962 A | * | 6/1980 | Bouyoucos .................. | 367/41 |
| 4,709,356 A | * | 11/1987 | Ayers .......................... | 367/19 |
| 4,798,156 A | * | 1/1989 | Langeland et al. ......... | 114/242 |
| 4,835,744 A | * | 5/1989 | Todd et al. .................. | 367/20 |
| 5,119,751 A | * | 6/1992 | Wood ......................... | 114/242 |
| 5,157,636 A | * | 10/1992 | Bjerkoy ....................... | 367/15 |
| 5,314,130 A | * | 5/1994 | Wood et al. ............... | 242/54 R |
| 5,532,975 A | * | 7/1996 | Elholm ....................... | 367/16 |
| 5,568,447 A | * | 10/1996 | Williams .................... | 367/20 |
| 5,784,335 A | * | 7/1998 | Deplante et al. ............ | 367/20 |
| 5,841,733 A | * | 11/1998 | Bouyoucos et al. ......... | 367/15 |
| 6,028,818 A | * | 2/2000 | Jeffryes ...................... | 367/20 |

* cited by examiner

Primary Examiner—S. Joseph Morano
Assistant Examiner—Lars A. Olson
(74) Attorney, Agent, or Firm—Martin LuKacher

(57) ABSTRACT

A marine towed array has a plurality of tow bodies of positive buoyancy each containing a marine acoustic source, such as a vibrator source. Each tow body uses a reel containing an electro-mechanical tow cable connecting the sources, whereby reeling and unreeling of the cable, controlled from a towing ship, changes the spacing of the tow bodies. One of the tow bodies at an end of the array is attachable to the towing ship.

9 Claims, 11 Drawing Sheets

TOWED ACOUSTIC SOURCE ARRAY SYSTEM FOR MARINE APPLICATIONS

This application claims the priority benefit of United States Provisional Application No. 60/140,392, filed Jun. 22, 1999.

DESCRIPTION

The present invention relates a towed acoustic source array of marine sources such as vibrator sources (Vibroseis type) of MULTIPULSE™ sources, for example of the type described in U.S. Pat. Nos. 4,131,178 issued Dec. 26, 1978, U.S. Pat. No. 4,207,962 issued Jun. 17, 1980, and U.S. Pat. No. 4,362,214, issued Dec. 30, 1986. The invention is especially suitable for use as a towed geophysical array for underwater geophysical exploration applications.

The array may use geophysical sources such as air guns as well as hydraulically driven marine vibrator units and MULTIUPLSE™ sources.

It is the principal feature of the invention to provide a towed array system where the depth and lateral position of each source may be set under tow and maintained and also where the separation of the sources may be varied so as to facilitate stowing thereof on a towing vessel and deployment to prescribed spacing between the sources.

Geophysical and other source arrays for marine applications have heretofore been proposed. See, for example, Bouyoucos, etal U.S. Pat. No. 5,841,733, issued Nov. 24, 1998. A towed source array system, particularly a geophysical source array for marine applications, which can readily be stowed aboard a vessel and then deployed at prescribed depths and with lateral positioning and maintained during operation at such depths and positioning has heretofore not been provided.

Briefly described, a marine towed array in accordance with the invention uses a plurality of tow bodies each containing an acoustic source. Each tow body including the source and any associated power supply and control systems are positively buoyant and contain control planes for driving the bodies under tow to a prescribed depth and lateral position and holding them there. Preferably the bodies are interconnected to the ship and to each other in series by electro-mechanical umbilical, tow cables. The bodies may contain reels from which the cables may be wound and unwound to change the spacing of the sources. The first tow body, at one end of the array, is attachable to the towing ship and the bodies, their positioning, their sources and reels are controllable from the ship.

The foregoing and other objects, features and advantages of the invention will become more apparent from a reading of the following description in connection with the accompanying drawings in which:

Figure 1A:
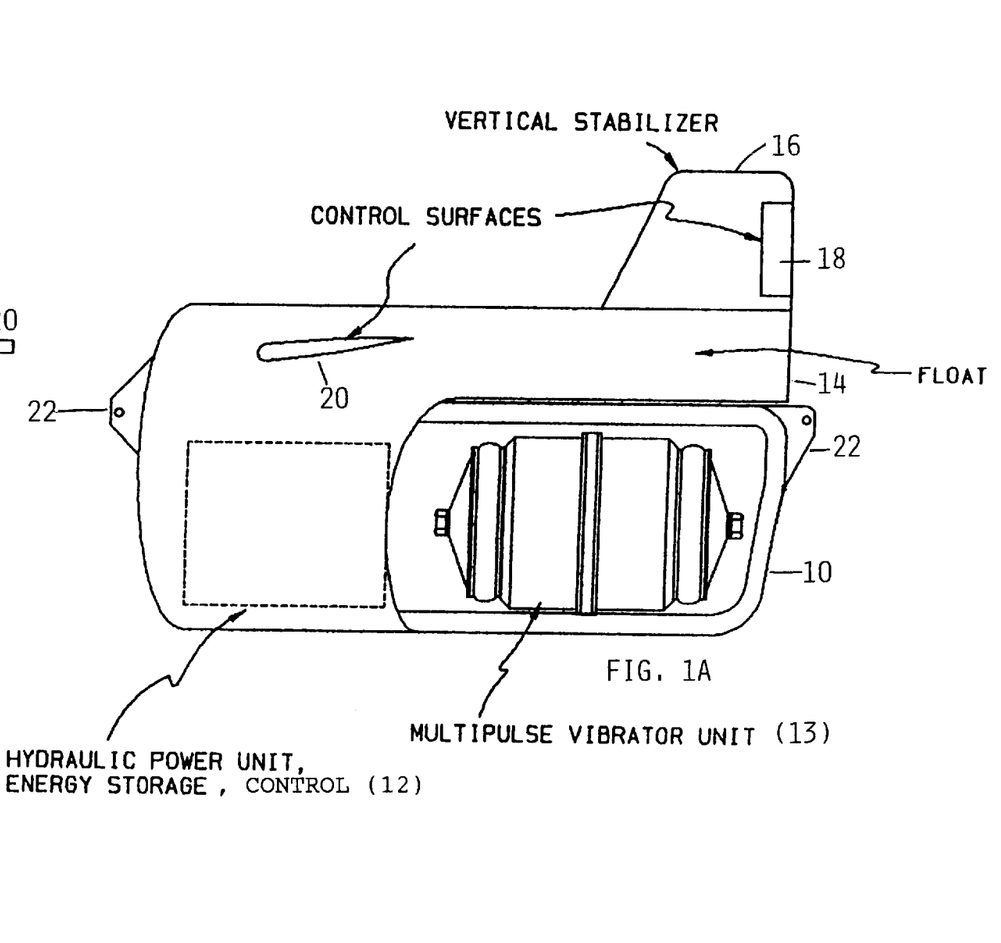
FIGS. 1A & 1B are a broken away side view, and an end view, respectively, of a unitary marine vibrating unit with a power supply and controls in a positively buoyant tow body with active control surfaces for lateral and depth positioning while under tow.
Figure 1B:
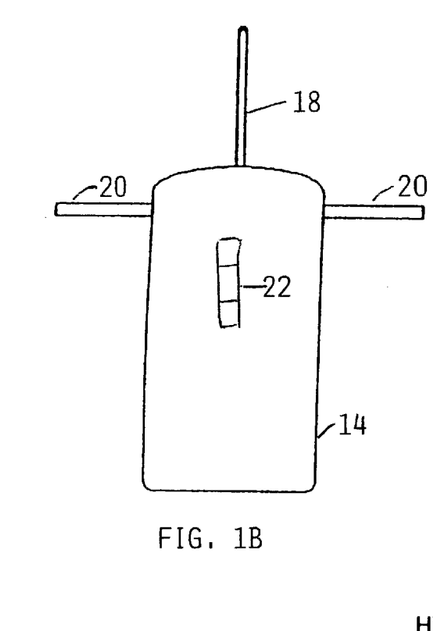

Referring to FIG. 1 there is shown a single marine tow body unit 10 and its associated hydraulic power, energy storage and control unit 12. This control unit receives control signals from the towing ship via an umbilical tow cable. The tow body contains a marine vibrator unit 13 and the hydraulic power storage and control unit 12. The tow body also contains floatation material sufficient to make this body positively buoyant. Control surfaces on the body are in the form of a vertical stabilizer 16 having a control surface 18 which is pivotable about a vertical axis, and pivotal diving planes 20 extending laterally from the body 14. Forward and aft brackets 22 are provided for attachment of the umbilical towing cable.

The control surfaces 18 and planes 20 are provided to drive the unit under tow to a prescribed depth and lateral position and hold it there. The control surfaces may be retractable so that they are not damaged during deployment and recovery of the array.

The horizontal planes 20 may be used in conjunction with depth sensors 24, which may be of the ultrasonic type, to detect the depth of the unit below the surface 26 of the water under which the array is disposed. See FIG. 2. The signals from the depth sensors and control signals from the towing ship operate the controls unit 12 to maintain a depth prescribed by a master control unit aboard the towing ship.

Figure 2:
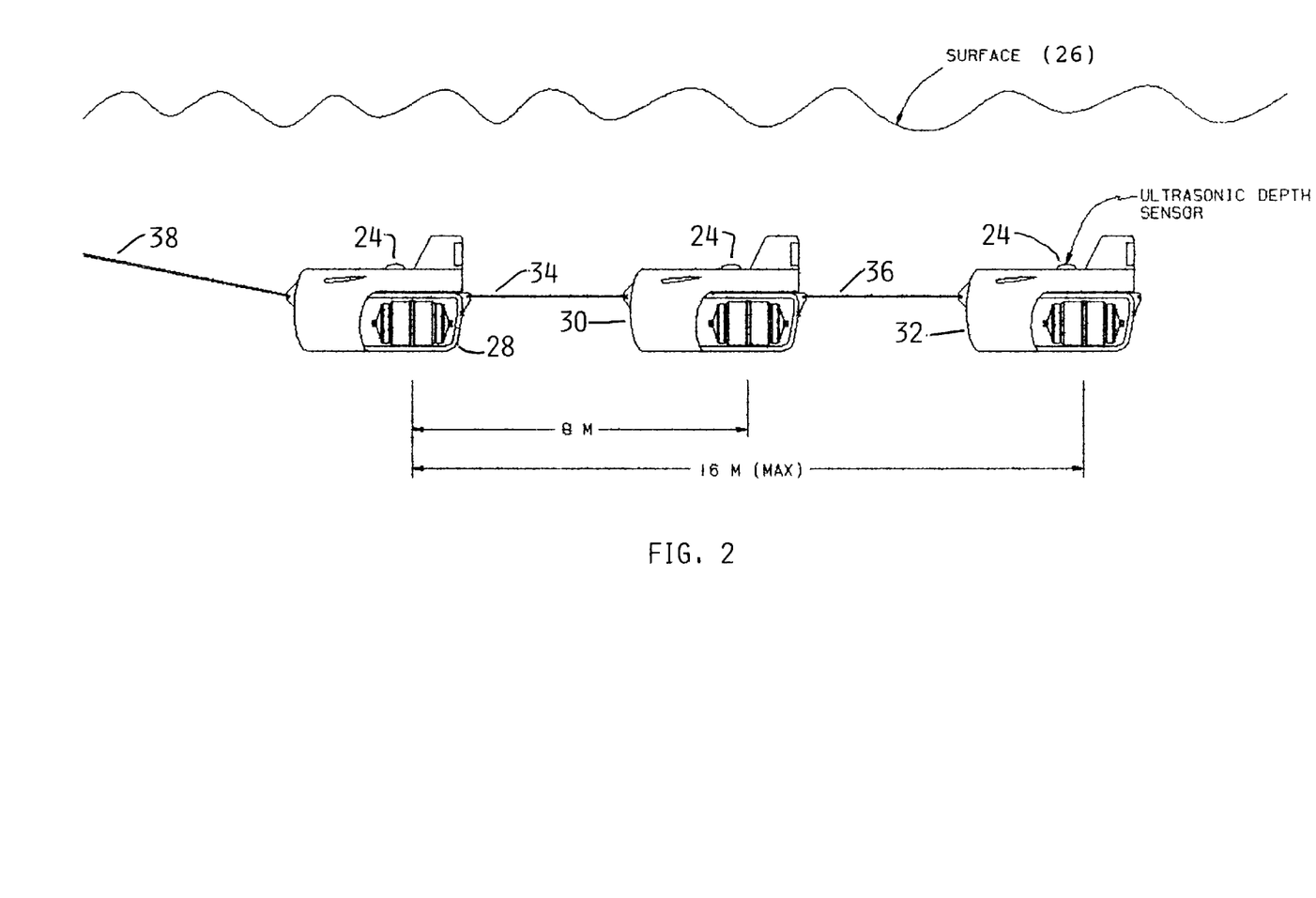
FIG. 2 is a schematic view showing three vibrating unit bodies under tow with individual depth sensors and control surfaces to maintain prescribed depth and lateral position.

The sensors 24 and the water (sea) surface 26 under which the array is towed is shown in FIG. 2 which illustrates a deployed array of three tow bodies 28, 30 and 32, and interconnecting umbilical tow cables 34 and 36 and a tow cable 38 connected to the first body 28 and to the towing ship.

The weight of the tow body, including the vibrator unit 10 and the power and control unit 12 may be about 7,600 pounds in air and 350 to 500 pounds (buoyant) submerged. The integral buoyant feature eliminates the need for a separate surface float and can significantly simplify the handling of the array.

Figure 3:
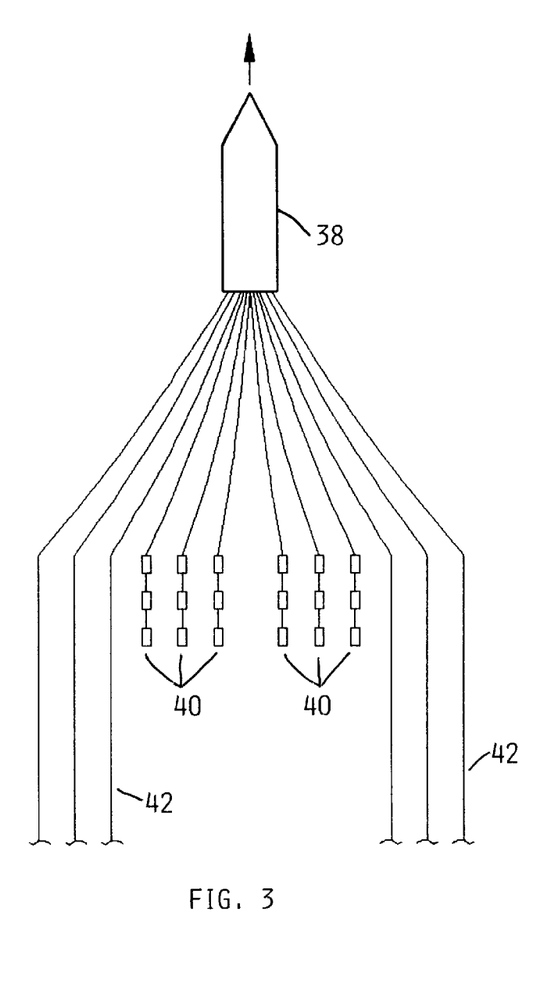
FIG. 3 is a schematic plan view showing a seismic survey vessel towing a plurality of marine vibrator unit sub-arrays each having a plurality of units such as shown in FIGS. 1A and 1B.

FIG. 3 illustrates a seismic vessel 38 towing six sub-arrays each containing three sub-arrays of tow bodies indicated at 40. Streamers 42 around the arrays may also be used in a manner similar to that used with air gun arrays.

In all cases the units may be driven deep to remain deployed and to ride out unanticipated heavy weather.

By operating the control planes 18 and 20, lateral source to source string (series) spacing, such as 8 meters, may be obtained even with the units driven deep, thereby avoiding entanglement of the units and their cables.

Figure 4:
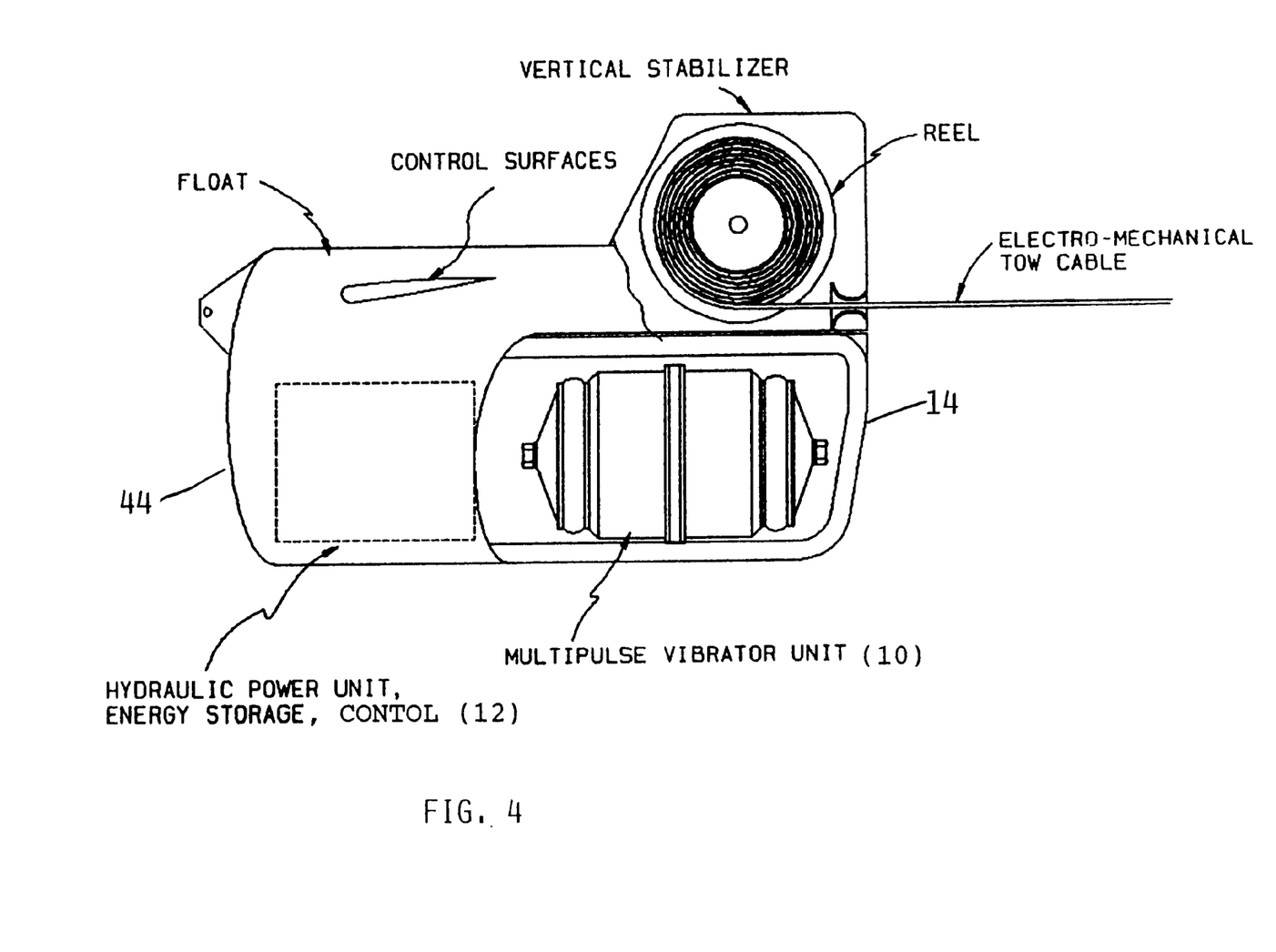
FIG. 4 is a broken away side view of a marine vibrator tow body with an integral cable reel to aid deployment and recovery, especially in heavy seas.

FIG. 4 illustrates a unit 44 similar to that shown in FIG. 1A but with addition of a cable reel to the tow body 14 to facilitate changing of the spacing between bodies with all bodies deployed, and also providing for deployment and recovery of one body at a time, well separated from neighboring bodies.

Figure 5:
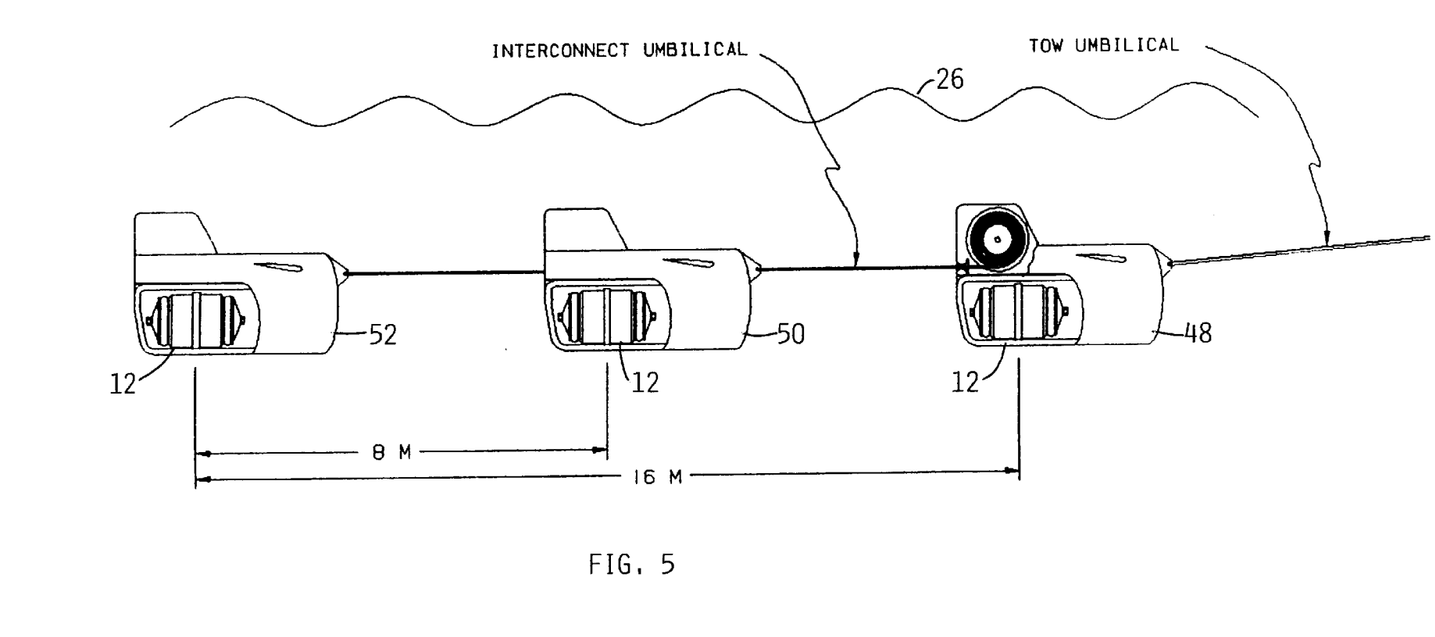
FIG. 5 is a view similar to FIG. 4 showing three marine vibrator units deployed at eight meter separation in a transmit array configuration.

FIG. 5 shows three bodies 48, 50 and 52 on a string or in series in a transmits configuration.

Figure 6:
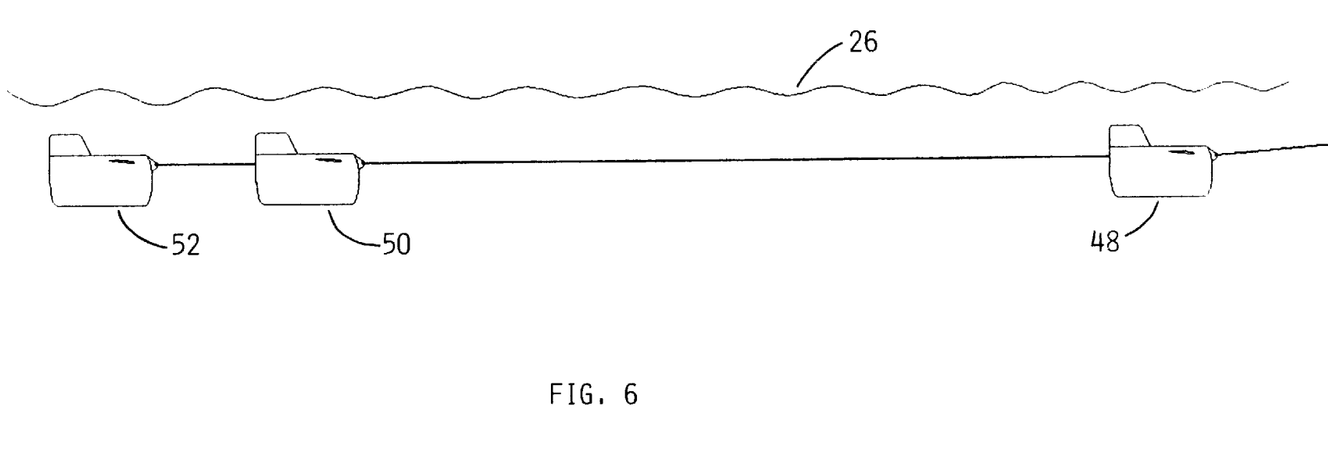
FIG. 6 is a schematic view illustrating the array shown in FIG. 5 spaced out for boarding on a towing ship.

FIG. 6 illustrates the bodies 48, 50 and 52 spaced out for boarding.

Figure 7:
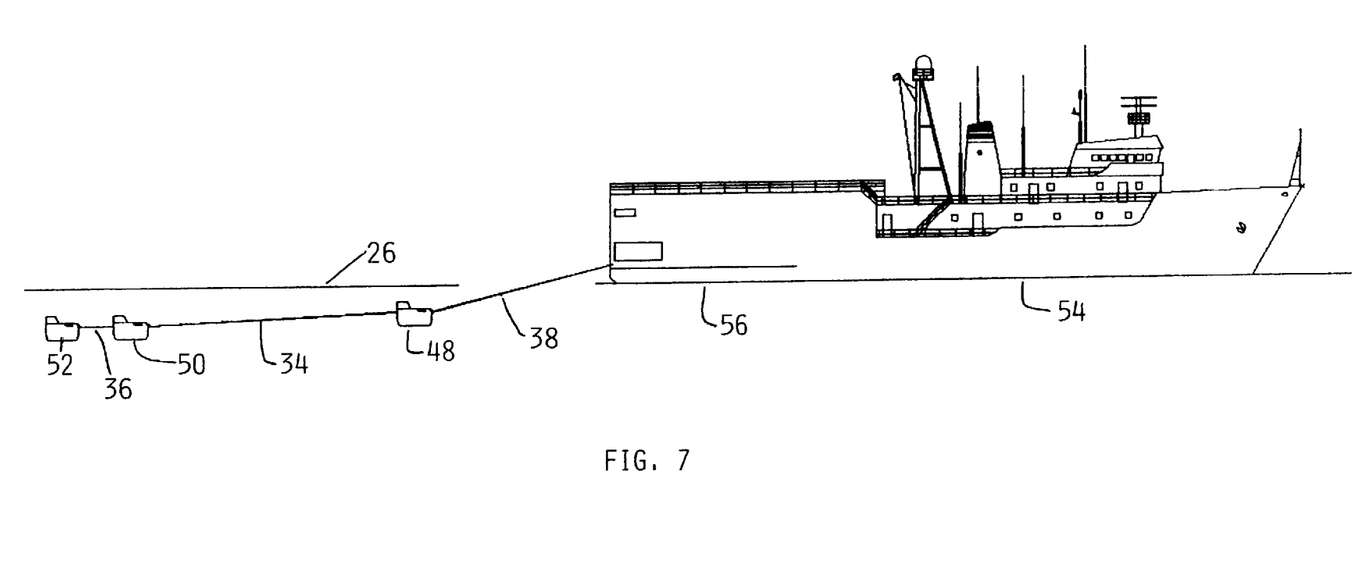
FIG. 7 is a schematic view illustrating the boarding of the array shown in FIG. 5 on approach to the towing ship.

FIG. 7 illustrates the towing vessel 54, which may be of the GEM class, having a stowing deck also known as a shelter deck 56 at the aft end thereof. Note that the bodies 48 and 50 are spaced away from each other during boarding.

Figure 8:
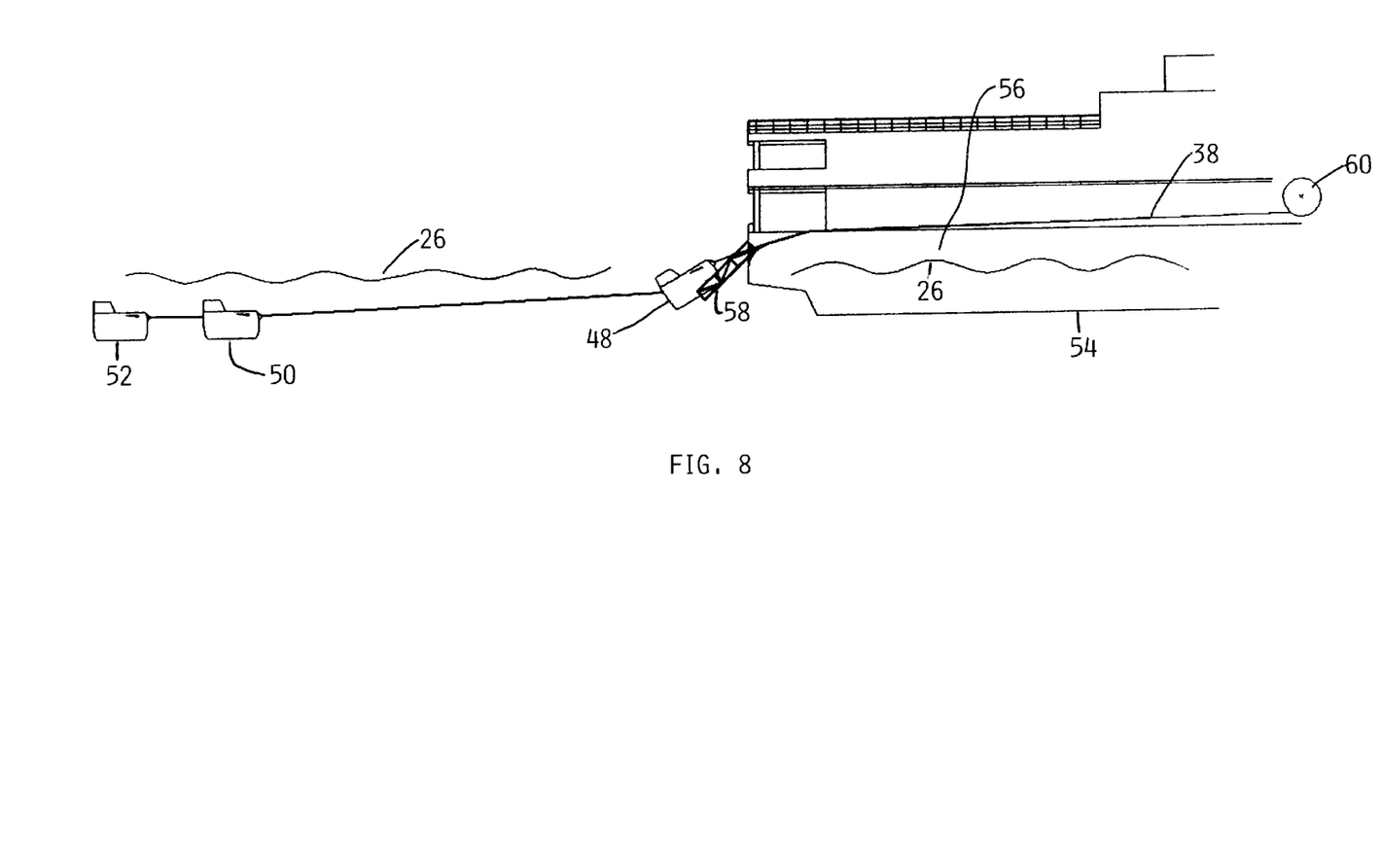
FIG. 8 is a view similar to FIG. 7 showing the first tow body in process of being boarded on the towing ship.

Referring to FIG. 8 the aft end of the vessel has a ramp or chute 58 extending rearwardly from the aft end onto the deck 56. The cable 38 is attached to a wench 60 on which it is wound during boarding and retrieval of the array.

Figure 9:
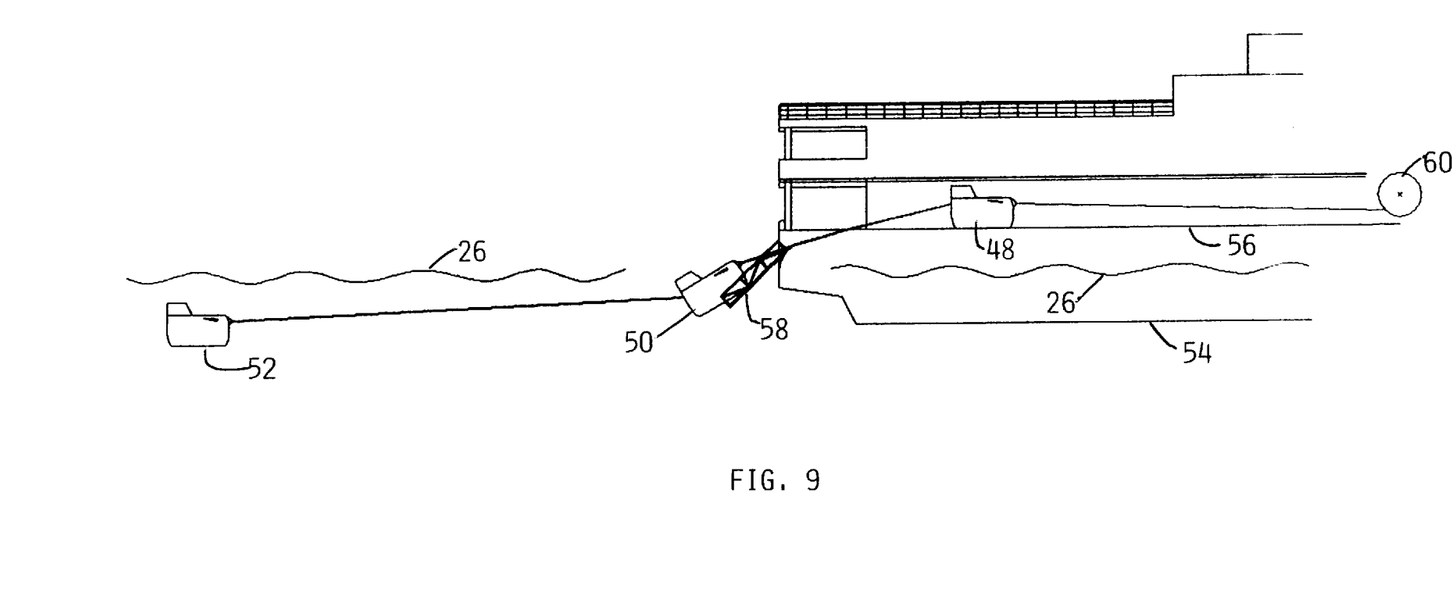
FIG. 9 is a view similar to FIG. 8 showing the boarding of the second tow body on the ship.

FIG. 9 shows the boarding of the second body 50. Note that the cable between the second and third bodies is spaced out to avoid entanglements while the cables between the bodies as they move onto the deck. The spacing is shortened to conserve space on the deck during stowage.

Figure 10:
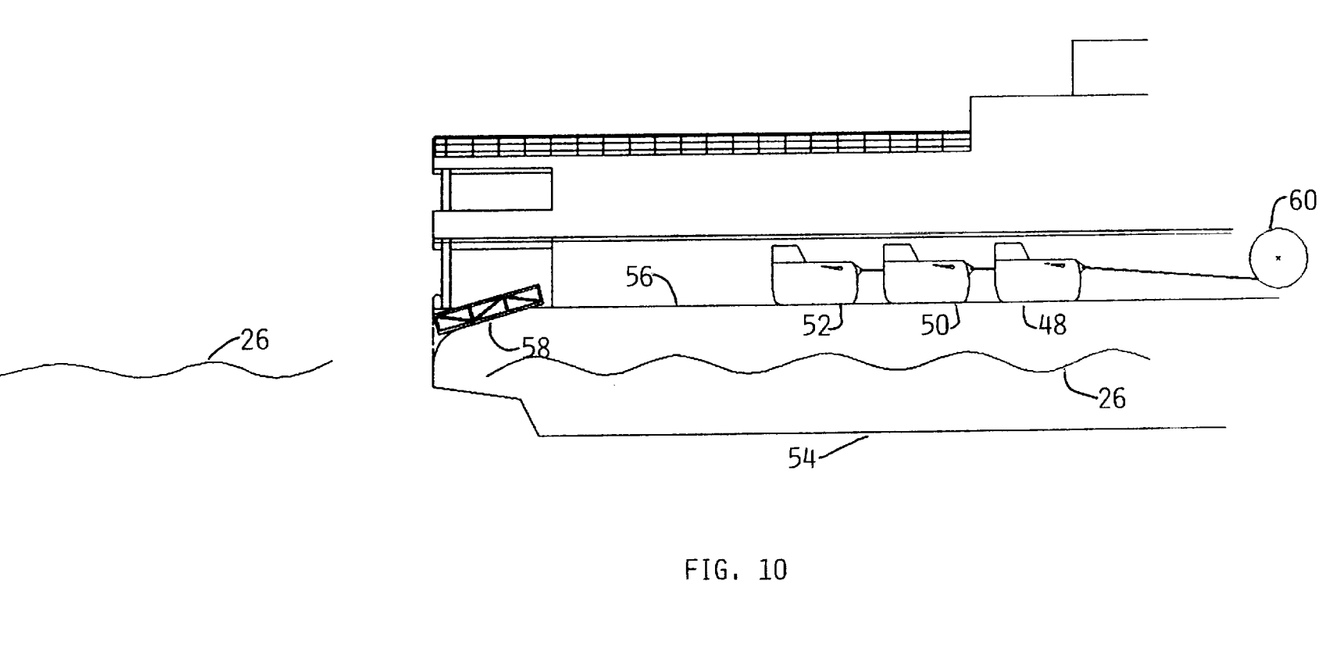
FIG. 10 is a view similar to FIG. 9 showing the boarding of the three tow bodies completed onto the stowing deck of the ship.

FIG. 10 illustrates all three units 48, 50 and 52 stowed in close proximity on the deck 56.

Figure 11:
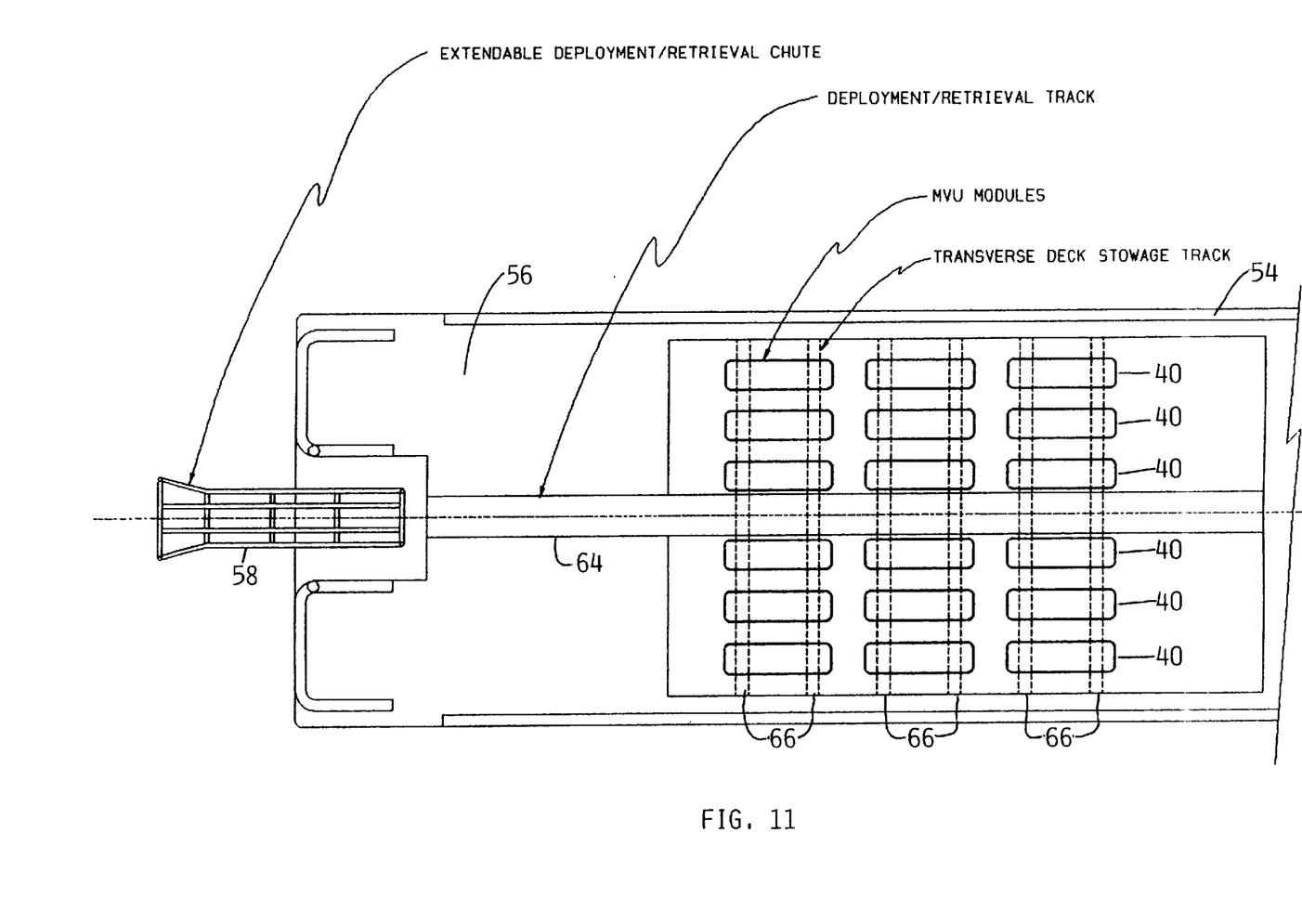
FIG. 11 is a plan view schematically showing the storage deck of a GEM class seismic towing ship, and particularly the stowing or sheltered deck thereof, with stowage tracks providing for captured movement of the tow bodies for deployment, retrieval and maintenance.

Referring to FIG. 11 there is shown a multiple sub-array system such as illustrated in FIG. 3 stowed on the deck 56 of the vessel 54. A track system consisting of a deployment and retrieval track 64 and transverse stowage tracks 66 allows for the lateral and longitudinal captured movement of the bodies of the sub-array to facilitate deployment, retrieval, storage and maintenance.

For deployment of the array system, whether of one or multiple sub-arrays, the recovery procedures described in connection with FIGS. 5 to 10 are reversed.

From the foregoing description it will be apparent that there has been provided an improved source array system for marine applications which is especially suitable for use in geophysical exploration. Variations and modifications of the herein described system, within the scope of the invention, will undoubtedly suggest themselves to those skilled in the art. Accordingly, the foregoing description should be taken as illustrative and not in a limiting sense.

What is claimed is:

1. A towed array system for use under water which comprises a plurality of tow bodies, each of said bodies having an acoustic source unit, a power supply for activating said unit to emit acoustic signals under water, control surfaces for positioning said body under tow laterally and at prescribed depth, and floatation material sufficient to make said body positively buoyant, and an umbilical tow cables connecting a first of said bodies to a towing vessel and interconnecting said bodies in series and extending string from said vessel.

2. The system according to claim 1 wherein said array includes a plurality of said series of arrays, each providing a sub-array, said plurality of sub-arrays being connected to said vessel in a side by side relationship.

3. The system, according to claim 1 wherein said vessel has a deck extending to an aft end of said vessel, a chute deployable from said aft end into the water for deploying from and boarding said tow bodies onto said deck.

4. The system, according to claim 1 wherein said control surfaces provide a vertical stabilizer and movable planes extending laterally from said body from opposite sides thereof.

5. The system, according to claim 1 wherein each of said bodies has a depth sensor thereon.

6. The system, according to claim 1 wherein at least the first of said bodies, which is connected to said vessel, has a reel containing said umbilical tow cable which connects said first body to the next of said bodies in said series, whereby reeling and unreeling of said cable controls the spacing of at least said first tow body from the rest of said series of tow bodies.

7. The system, according to claim 6 wherein said tow bodies each have a reel containing said umbilical tow cables interconnecting said bodies, whereby reeling and unreeling of said cable changes the spacing of said tow body during deployment and for stowing on said vessel.

8. A marine towed array system comprising tow bodies having positive buoyancy, a plurality of marine acoustic sources, in said bodies of weight of about 7,000 to 8,000 pounds in air and size of about 2 cubic feet, each body having a reel containing an electro-mechanical tow cable interconnecting the bodies, whereby reeling and unreeling of the cable, controlled from a towing ship, changes the spacing of said bodies, and one of the bodies at an end of the array is attachable to the towing ship via said cable.

9. The system, according to claim 8 wherein said bodies have control planes for positioning said bodies at prescribed depth and laterally when under tow.

* * * * *